Dec. 5, 1972   W. C. GWINNER   3,705,122
COMPOSITIONS FOR MOLDING SEALING LINERS OR THE
LIKE HAVING CONTRASTING COLORS

Original Filed July 27, 1967   2 Sheets-Sheet 1

INVENTOR.
WALTER C. GWINNER
BY
*Harry G. Shapiro*
ATTORNEY

INVENTOR.
WALTER C. GWINNER
BY
Harry T. Shapiro
ATTORNEY

United States Patent Office 3,705,122
Patented Dec. 5, 1972

3,705,122
COMPOSITIONS FOR MOLDING SEALING LINERS OR THE LIKE HAVING CONTRASTING COLORS
Walter C. Gwinner, Stamford, Conn., assignor to Zapata Industries Inc., Frackville, Pa.
Original application July 27, 1967, Ser. No. 656,399, now Patent No. 3,547,746, dated Dec. 15, 1970. Divided and this application May 26, 1970, Ser. No. 40,658
Int. Cl. C08f 45/04, 45/08, 45/14
U.S. Cl. 260—23 XA                     7 Claims

ABSTRACT OF THE DISCLOSURE

Thermoplastic resin compositions formulated with pigments to furnish contrasting colors in raised and background areas upon molding heated charges of the compositions with a die having relieved areas, and methods for molding and imparting contrasting colors to an article in a single molding operation.

---

This application is a division of pending application Ser. No. 656,399, filed July 27, 1967; now Pat. No. 3,547,746, granted Dec. 15, 1970.

The invention relates to thermoplastic resin compositions compounded with pigments to furnish contrasting colors upon being molded with a die having a relieved area or areas and to methods for obtaining, in a single operation, contrasting colors upon molding a heated charge of the composition.

As disclosed, for example, in Aichele Pat. No. 3,135,019, June 2, 1964, it is known to meter heated charges of thermoplastic material of predetermined quantity into successive bottle caps or the like following which the charges are molded in the caps by molding plungers to provide sealing liners for the caps. In addition to the sealing function of the liners provided within the caps or the like, it has been desired that the liners also furnish an indicia, logo, trademark or suitable decoration for advertising or product promotional purposes. It is of course highly desirable that such added value or function of the sealing liner be achieved with a minimum of expense, or without having to resort to any additional operations to manufacture the lined caps.

Accordingly, it is a primary object of the invention to provide thermoplastic resin compositions which are so formulated that the self-same operation of molding a sealing liner thereof in a cap will additionally provide a desired indicia, logo, decoration or the like in a color which contrasts with the background area for the indicia or the like.

While the compositions and methods of the invention will be specifically described with relation to the processing of sealing liners for bottle caps, it will be understood that the invention is applicable to the production of labels, signs, tags or other devices where indicia or the like having a color in contrast to the background is desired.

The foregoing primary object and other objects and advantages of the invention will be apparent from the following detailed description, taken in conjunction with the drawings which illustrate a preferred embodiment of the invention, in which.

Figure 1:
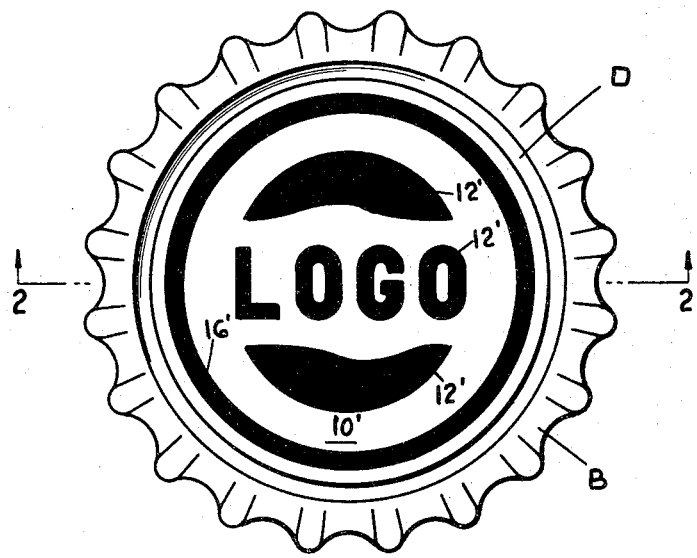
FIG. 1 is an inside plan view, on an enlarged scale of a bottle cap having a sealing liner molded therein, the sealing liner being provided with indicia having a color which is in contrast to the color of the surrounding background.

In accordance with the invention generally, a composition is provided which comprises a thermoplastic resin and a selected mixture of pigments. The resin ingredient is solid at room temperature and, in the absence of the pigment mixture, would furnish a clear or transparent article upon molding. The pigments of the pigment mixture are of such colors, in proportion to one another, and in total amount with relation to the amount of resin of the composition, that when a heated charge of the composition is molded with an embossing die or the like to furnish a background area of a predetermined thinness, such background area is transparent and the raised area or areas in relief are of a sharply contrasting dark or opaque color.

Initially, the composition of the invention preferably is in the form of a dry blend mixture of a thermoplastic resin and selected pigments. A suitable plasticizer and a stabilizer may be included. The dry blend mixture may be in the form of a powder or pellets. The mixture, when conditioned for example by an extruder screw and with heat as disclosed in the aforementioned Aichele patent, is consolidated to a fused or softened and moldable condition. Heated charges of the composition are molded by a cooled die having a relieved area or areas to furnish a raised area corresponding to the relieved area of the die and an adjoining relatively thin background area. While for most applications a cooled embossing die may be pressed against the heated mass of moldable plastic material, it is within the scope of the invention to inject the composition into a closed mold assembly, one or both of the dies of which may have relieved areas to furnish the area raised in relief desired in the finished molded product.

The thermoplastic resin ingredient of the composition may be plasticized or unplasticized depending upon the particular composition of the resin. Examples of suitable thermoplastic resins are polyvinyl chloride, copolymers of vinyl chloride and vinyl acetate, ethyl cellulose, cellulose acetate, cellulose acetate-butyrate, polyethylene, terpolymers, alkyl acrylates, copolymers and terpolymers of styrene, polyurethanes, polyamides, polyolefins, and blends of condensation polymers with natural or synthetic rubber. Polyvinyl chloride having a medium molecular weight is preferred for the sealing liner application. When such resin is used, it is preferred that a plasticizer be included.

Where a thermoplastic resin is used which requires a plasticizer and where the end product will be used where it may contact a food or beverage, a plasticizer is selected which is non-toxic and odorless. Any known non-toxic plasticizer may be used for the sealing liner application; for example, dioctyl phthalate, acetyl tributyl citrate or diisobutyl adipate. The amount of plasticizer may vary from 10 to 90 parts per 100 parts of resin. For the sealing liner application, and with the preferred medium molecular weight polyvinyl chloride and preferred dioctyl phthalate plasticizer, the preferred ratio of resin to plasticizer is 100 parts of resin to approximately 80 parts of plasticizer to furnish the desired resiliency and for most uniform machine operation.

In order to achieve a product which upon the molding of a charge of the heated plastic composition will furnish contrasting colors or a sharp two-toned effect, the pigment mixture which is intimately mixed with the thermoplastic resin comprises particles of a white pigment and particles of a second or non-white pigment. The second pigment is either black or a primary color, that is, red, blue, green or yellow, or an intermediate of these primary colors. Examples of the white pigment are titanium dioxide, preferably rutile, or zinc oxide. Titanium dioxide is preferred. Examples of the second or non-white pigment are carbon black, iron oxide red, monastral red, quinaeridone red, monastral blue, iron blue, phthalocyanine blue, phthalocyanine green, zinc chromate or Hansa Yellow. While other black, red, blue, green and yellow pigments may be used, a non-toxic pigment is selected for a food or beverage application.

The ratio of white pigment to non-white pigment is significant; also, the total amount of pigments present in the composition is significant. The ratio of white pigment to the second or non-white pigment is in the range of approximately 10 to 20 with a ratio of 13.8 preferred. The total amount of pigments present in the composition is in the range of approximately 0.135 to 0.540 parts per 100 parts of resin. Preferably, the pigments are present in the amount of 0.20 parts per 100 parts of the resin ingredient.

The significance of the ratio of white pigment to the second pigment, be it black, red, blue, green, yellow or an intermediate of the primary colors, and the significance of the total amount of the pigments in the composition are that such ratio of pigments one to another, and such total amount of pigments in the composition determine the clarity of the background or thin area and the intensity of contrast of such area with respect to the raised or relatively thick area of the molded and embossed composition. It has been found that a heated charge of predetermined amount of a composition as above described which, when molded with a cooled embossing die or the like to furnish a background area having a thinness of not more than approximately 0.014 inch and a raised area or area in relief of not less than approximately 0.018 inch, results in a substantially clear background area and a contrasting colored, opaque raised area. A sharper contrast is obtained when the background area is reduced in thickness to 0.007 inch or less and the embossed area is increased to 0.023 inch or more.

When the pigments of the mixture are white and black, the raised area is gray as distinguished from the substantially transparent background. When the pigments are white and red, the area in relief is opaque and red as distinguished from the substantially transparent background area. Similarly, when the second pigment is blue or green or yellow, or any of the intermediate hues, the embossed or raised area is such respective color and opaque in contrast to the substantially transparent thin background area. Although the opaque raised area does not have the darkness of the black pigment alone, or the hue of the red, blue, green, yellow, or of the intermediate hues respectively alone, the embossed area or area in relief is distinctly opaque and of a sharply contrasting color as compared to the adjoining substantially transparent background area.

It will be understood that various modifying ingredients may be included in the composition, the inclusion of such modifying ingredients depending upon the particular use or application of the finished molded product.

The composition may include a stabilizer such as a metallic soap. Where the composition will be used with relation to a food or beverage, the stabilizer is of course selected for its non-toxicity. Suitable non-toxic metallic soap stabilizers are the stearates, oleates, palmitates, ricinoleates, and laurates of calcium, aluminum, magnesium, zinc and lithium. Calcium stearate is preferred because of its relatively low cost. For the sealing liner application, the metallic soap stabilizer to resin ratio may vary from one part to six parts of stabilizer to one hundred parts of the resin ingredient. A preferred amount is three parts of stabilizer to one hundred parts of resin.

It is also preferred to include an auxiliary stabilizer which acts both as a plasticizer and as a synergizer to minimize the release of hydrochloric acid upon heating when a vinyl resin, as preferred, is used. An example of an auxiliary stabilizer is epoxidized soybean oil. Epoxidized soybean oil acts as a synergist to the metallic soap stabilizer and thus provides more effective utilization of the metallic soap. Also, since the auxiliary stabilizer additionally acts as a plasticizer, the amount of primary plasticizer is reduced. The ratio of auxiliary to the metallic soap stabilizer is 2:1. However, the ratio of auxiliary stabilizer to resin may vary from five parts to any upper limit per one hundred parts of the resin. The synergistic effect of the auxiliary stabilizer exists at a lower range and therefore increased quantities do not provide any added benefit to the effect of the main or metallic soap stabilizer.

A preferred example of a composition found to be particularly suitable for the molding of sealing liners for bottle caps or the like which upon the molding thereof also furnishes the desired contrasting colors is as follows:

|  | Parts by weight, lbs. | Percent |
| --- | --- | --- |
| Resin (polyvinyl chloride) | 543.0 | 54.3 |
| Plasticizer (dioctyl phthalate) | 421.0 | 42.1 |
| Stabilizer (calcium stearate) | 8.0 | 0.8 |
| Auxiliary stabilizer (epoxidized soybean oil) | 26.0 | 2.6 |
| Pigment paste | 2.0 | 0.2 |
| Total | 1,000.0 | 100.0 |

Since the amounts of pigments used in the formulation are small, they may be included by making a paste to facilitate handling and to insure their presence in their proper small amounts. Thus, where an embossed, opaque gray color is desired to contrast with an adjoining transparent background, titanium dioxide and carbon black are mixed with plasticizer and auxiliary stabilizer as follows to furnish the two pounds of the pigment paste in the formulation indicated above:

|  | Parts by weight, lbs. | Percent |
| --- | --- | --- |
| White pigment (titanium dioxide) | 0.964 | 48.2 |
| Black pigment (carbon black) | 0.070 | 3.5 |
| Plasticizer (dioctyl phthalate) | 0.786 | 39.3 |
| Auxiliary stabilizer (epoxidized soybean oil) | 0.180 | 9.0 |
| Total | 2.000 | 100.0 |

The foregoing preferred composition for a sealing liner for bottle caps or the like furnishes a ratio of white pigment to the second or non-white pigment of approximately 13.8. The total amount of the pigments present in the composition is approximately 0.20 part per one hundred parts of resin.

Figure 2:
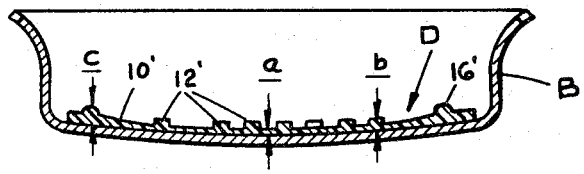
FIG. 2 is a vertical, cross-sectional view taken approximately in the plane of line 2—2 of FIG. 1.
Figure 3:
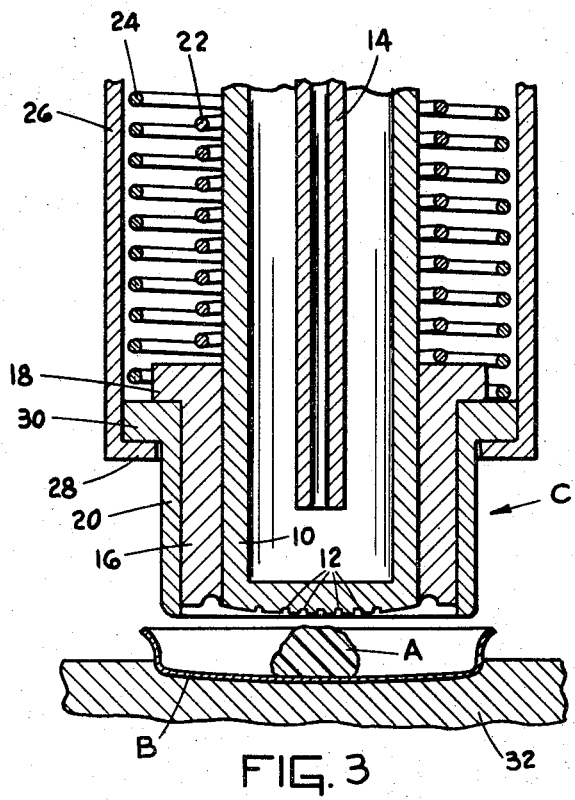
FIG. 3 is a vertical, cross-sectional view showing a cap having a charge of plastic material positioned there-in in readiness for the operation thereon of apparatus to produce a molded and contrastingly colored sealing liner as shown in FIG. 1.

Referring to the drawings, a composition as set forth in the example above is heated and worked in an extruder as shown in the aforementioned Aichele patent at FIGS. 2 and 3. Heated charges of a predetermined amount of such composition are metered into successive caps, a charge being shown in FIG. 3 herein and designated A, the cap being designated B. Still referring to FIG. 3 herein, the charge A is molded in the cap B by a molding plunger assembly C. The molding plunger assembly may be essentially the same as disclosed in the aforementioned Aichele patent except that the punch or plunger 10 is provided on its working face with relieved areas 12 of a configuration corresponding to the indicia or logo and decorative areas 12' (FIGS. 1 and 2) desired in the molded sealing liner. Thus, the punch 10 is in effect an embossing die. The background area formed by the non-relieved area or areas of the embossing die is designated 10'.

Figure 4:
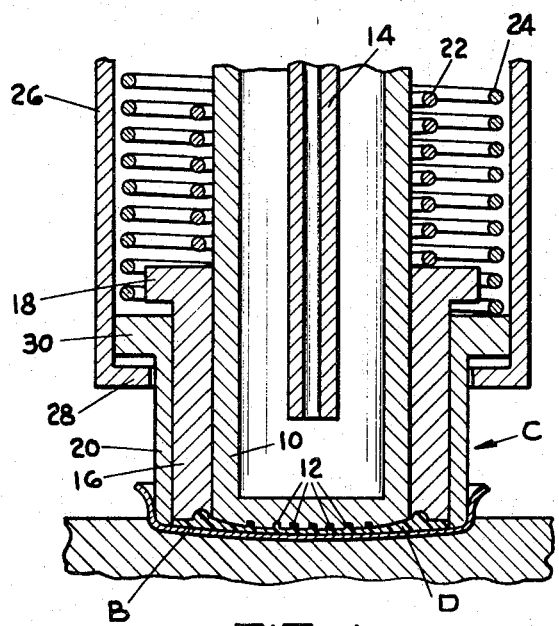
FIG. 4 is a view similar to FIG. 3 except that the apparatus is shown in the down or molding and embossing position.

As shown in FIGS. 3 and 4, the die 10 is cooled by the circulation of a coolant through the tube 14. The embossing die 10 is surrounded by an annular die or sleeve 16 which serves to furnish the sealing bead 16' of the sealing liner D. The bead forming sleeve 16 is provided with an external annular flange 18 to engage a tubular fender sleeve 20. Both the sealing bead sleeve 16 and the fender sleeve 20 are resiliently mounted by the respective springs 22 and 24. A dependent stirrup 26 provided with a stop projection 28 coacts with an external flange 30 or the fender sleeve. The caps B are supported upon an anvil 32.

When the plunger assembly C is moved from the position shown in FIG. 3 to the molding position shown in FIG. 4, the measured, heated charge of the composition is formed into a sealing liner D within the cap B as shown in FIGS. 1 and 2. With a composition as set forth in the foregoing example, wherein the pigments are titanium dioxide and carbon black, the raised areas as represented by the indicia or logo and the decorative portions 12' and the sealing bead 16' are a dark gray color in sharp contrast with the background area 10' which is clear or transparent. Such sharply contrasting colors are obtained when a charge A is of an amount to furnish a background area 10' having a thinness $a$ in the range of 0.005 to 0.007 inch and a range of thickness $b$ of the embossed area 12' (FIG. 4) in the range of 0.023 to 0.025 inch. The sealing bead area has a thickness $c$ in the range of 0.035 to 0.037 inch. An embossed area 12' having a thickness of 0.018 inch is still distinctively opaque and contrasted to the thinner background area 10'.

While the preferred form of the invention has been described with respect to the lining of caps of the crown type, it will be understood that the compositions of the invention and the methods of molding are suitable for the lining of caps of the screw-on and press-on types. Also, depending upon the type of resin of the molding composition, an adhesive coating on the metal surface may be included or omitted.

It will be further apparent that for applications other than for sealing liners for caps a wider range of background thinness and indica or raised area thickness is permitted while still affording the two-toned or sharply contrasting colors.

While the preferred composition of the invention is initially in the form of a substantially dry blend mixture, it has been determined that the described distinctive, contrasting color effect is obtained with a resin in plastisol form when pigments in the ratio and total amount as hereinbefore described are mixed with this form of resin. As known in the art, a plastisol is a mixture of a resin with a plasticizer in which it is substantially insoluble at room temperature, but in which it is substantially completely soluble at an elevated temperature. When the mixture is heated, the resin dissolves in the heated plasticizer, and when the solution cools a permanent gel is formed. Examples of the plastisols are polyvinyl chloride and its copolymers with plasticizers such as dioctyl phthalate, acetyl tributyl citrate, diisobutyl adipate, butyl phthalyl butyl glycolate, ethyl phthalyl ethyl glycolate, methyl phthalyl ethyl glycolate, etc. The plastisols mixed with white and a non-white pigment in the ratio one to another and in total amount with respect to the amount of resin as hereinbefore described, when molded and embossed to furnish a raised area and adjoining background area of the dimensional parameters as hereinbefore described, results in the distinctive opaque and adjoining transparent areas.

It is believed that the advantages and improved results of the invention will be apparent from the foregoing description of a preferred embodiment thereof. It will be apparent that various changes and modifications may be made without departing from the spirit and scope of the invention as sought to be defined in the following claims.

I claim:

1. A composition for molding sealing liners having contrasting colors, the composition comprising in intimate mixture a thermoplastic resin and a pigment mixture, the thermoplastic resin being solid at room temperature and, in the absence of the pigment mixture, furnishing a clear article upon molding, the pigment mixture comprising a white pigment and a second pigment selected from the class consisting of red, blue, green, yellow, intermediates thereof, and black, the ratio of white pigment to said second pigment being in the range of approximately 10 to 20, the pigments being present in the amount of approximately 0.135 to 0.540 part per 100 parts of thermplastic resin.

2. A composition as set forth in claim 1, wherein the thermoplastic resin is plasticized polyvinyl chloride and the resin and pigments are in dry blend mixture.

3. A composition as set forth in claim 1, wherein the white pigment is titanium dioxide.

4. A composition as set forth in claim 1, wherein the range of white pigment to the second pigment is approximately 13.8, and the pigments are present in the amount of approximately 0.20 part per 100 parts of thermoplastic resin.

5. A composition for molding sealing liners having contrasting colors for bottle caps or the like comprising, by weight, approximately 54% thermoplastic resin, approximately 42% plasticizer, approximately 0.10% white pigment and approximately 0.007% of a second pigment selected from the class consisting of red, blue, green, yellow, intermediates thereof, and black, the remainder of the composition being a stabilizer.

6. A composition as set forth in claim 5, wherein the thermoplastic resin is polyvinyl chloride, and the white pigment is titanium dioxide.

7. A composition as set forth in claim 6, wherein the plasticizer is dioctyl phthalate, the second pigment is carbon black, and the stabilizer is a mixture of calcium stearate and epoxidized soybean oil.

References Cited

UNITED STATES PATENTS

| 2,062,137 | 11/1936 | McKinney et al. | 106—193 X |
| 3,442,838 | 5/1969 | Hoshi et al. | 260—23 |
| 3,029,765 | 4/1962 | Navikas | 264—268 |

OTHER REFERENCES

Penn: "PVC Technology" (1962), pp. 175 to 182.

Imperial Chemical Industries, Ltd., "The Colouring of Plastics," pp. 25–40 (1961).

DONALD E. CZAJA, Primary Examiner

D. J. BARRACK, Assistant Examiner

U.S. Cl. X.R.

106—193 J, 193 P; 260—3, 31.8 R, 37 R, 37 N, 37 P, 41 R, 41 B, 41 C